US011887792B1

(12) United States Patent
Li et al.

(10) Patent No.: US 11,887,792 B1
(45) Date of Patent: Jan. 30, 2024

(54) KEYBOARD DEVICE AND KEY STRUCTURE THEREOF

(71) Applicant: Primax Electronics Ltd., Taipei (TW)

(72) Inventors: Che-An Li, Taipei (TW); Lei-Lung Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/077,103

(22) Filed: Dec. 7, 2022

(30) Foreign Application Priority Data

Oct. 18, 2022 (TW) ................................ 111139527

(51) Int. Cl.
*H01H 13/7065* (2006.01)
*H01H 3/12* (2006.01)
*H01H 13/14* (2006.01)

(52) U.S. Cl.
CPC .......... *H01H 13/7065* (2013.01); *H01H 3/12* (2013.01); *H01H 13/14* (2013.01); *H01H 2231/002* (2013.01)

(58) Field of Classification Search
CPC ...... H01H 13/7065; H01H 3/12; H01H 13/14; H01H 2231/002; H01H 3/125; H01H 13/70; H01H 13/702; H01H 13/703; H01H 13/704; H01H 13/705; H01H 2209/03; H02H 2227/024
See application file for complete search history.

(56) References Cited

U.S. PATENT DOCUMENTS 11,651,912 B1 * 5/2023 Pan ........................ H01H 13/83 200/502
2023/0223214 A1 * 7/2023 Pan ........................ H01H 13/14 200/341

* cited by examiner

*Primary Examiner* — Lheiren Mae A Caroc
(74) *Attorney, Agent, or Firm* — KIRTON McCONKIE; Evan R. Witt

(57) ABSTRACT

A key structure includes a base plate, a keycap, a membrane circuit board and an elastic plate. The keycap is located over the base plate. The keycap includes a top wall and a skirt part. The membrane circuit board is arranged between the keycap and the base plate. The membrane circuit board includes a pressure sensing structure. The elastic plate is arranged between the keycap and the membrane circuit board. The elastic plate includes a triggering part. The triggering part is extended toward the membrane circuit board and aligned with the pressure sensing structure. While the keycap is moved downwardly toward the elastic plate, the skirt part of the keycap is correspondingly moved to press the elastic plate. Consequently, the triggering part is moved downwardly to press the pressure sensing structure.

11 Claims, 7 Drawing Sheets

KEYBOARD DEVICE AND KEY STRUCTURE THEREOF

FIELD OF THE INVENTION

The present invention relates to an input device, and more particularly to a keyboard device and a key structure of the keyboard device.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The input devices of the common electronic devices include for example mouse devices, keyboard devices, trackball devices, or the like. Via the keyboard device, texts or symbols can be inputted into the computer system directly. As a consequence, most users and most manufacturers of input devices pay much attention to the development of keyboard devices.

Generally, a keyboard device comprises plural key structures. Each key structure comprises a keycap, a scissors-type connecting member, a membrane circuit board and a base plate. These components are stacked on each other sequentially. In case that the keyboard device is a luminous keyboard device, the keyboard device is additionally equipped with a backlight module under the base plate.

Moreover, a membrane switch is installed on the membrane circuit board, and an elastic element (e.g., a rubber dome) is arranged between the keycap and the membrane circuit board. The scissors-type connecting member is connected between the keycap and the base plate. Moreover, the scissors-type connecting member comprises a first frame and a second frame. The second frame is pivotally coupled to the first frame. Consequently, the first frame and the second frame can be swung relative to each other.

While the keycap of any key structure is depressed and moved downwardly relative to the base plate, the first frame and the second frame of the scissors-type connecting member are switched from an open-scissors state to a stacked state. Moreover, as the keycap is moved downwardly to compress the elastic element, the corresponding membrane switch is pressed and triggered by the elastic element. Consequently, the keyboard device generates a corresponding key signal.

When the keycap of the key structure is no longer pressed, the keycap is moved upwardly relative to the base plate in response to an elastic restoring force of the elastic element. Consequently, the first frame and the second frame are switched from the stacked state to the open-scissors state, and the keycap is returned to its original position.

However, the conventional keyboard device still has some drawbacks. For example, the keyboard device is only able to detect whether any key structure is pressed down, but unable to detect the magnitude of the pressure. For solving the above drawbacks, a pressure sensitive keyboard device has been introduced into the market. The pressure sensitive keyboard device is capable of detecting the magnitude of the pressure that is applied on the key structure by the user. In addition, the pressure sensitive keyboard device generates a corresponding key signal. Generally, the pressure sensitive keyboard device is additionally equipped with a pressure sensing structure. The pressure sensing structure is used to sense the magnitude of the pressure. In the conventional pressure sensitive keyboard device, only the elastic element (e.g., a rubber dome or a spring) of the key structure is used to exert the pressure and sense the corresponding pressure. The design of only using the elastic element as the force point cannot accurately sense the magnitude of the pressure. Moreover, in case that the elastic element is used as the force point, the elastic element has to be moved for a long displacement to touch the pressure sensing structure. As a consequence, this design cannot be applied to a slim-type electronic device (e.g., a notebook computer).

Therefore, there is a need of providing an improved keyboard device and an improved key structure in order to overcome the drawbacks of the conventional technologies.

SUMMARY OF THE INVENTION

An object of the present invention provides a keyboard device. The keyboard device includes plural key structures. In each key structure, a skirt part of a keycap is moved downwardly to press a pressure sensing structure of a membrane switch board. Consequently, a pressure applied on the key structure can be sensed.

Another object of the present invention provides a key structure. In the key structure, a skirt part of a keycap is moved downwardly to press a pressure sensing structure of a membrane switch board. Consequently, a pressure applied on the key structure can be sensed.

The other objects and advantages of the present invention will be understood from the disclosed technical features.

In accordance with an aspect of the present invention, a keyboard device is provided. Each of the plural key structures includes a base plate, a keycap, a membrane circuit board and an elastic plate. The keycap is located over the base plate. The keycap includes a top wall and a skirt part. The skirt part is protruded from a periphery region of the top wall and extended toward the base plate. The membrane circuit board is arranged between the keycap and the base plate. The membrane circuit board includes at least one pressure sensing structure. The elastic plate is arranged between the keycap and the membrane circuit board. The elastic plate includes at least one triggering part. The at least one triggering part is extended toward the membrane circuit board and aligned with the at least one pressure sensing structure. While the keycap is moved downwardly toward the elastic plate, the skirt part of the keycap is correspondingly moved to press the elastic plate, and the elastic plate is subjected to deformation. Consequently, the at least one triggering part is moved downwardly to press the at least one pressure sensing structure.

In an embodiment, the elastic plate further includes at least one raised platform, and the at least one raised platform is protruded toward the keycap and aligned with the skirt part of the keycap. While the keycap is moved downwardly toward the elastic plate, the skirt part of the keycap is correspondingly moved to press the at least one raised platform of the elastic plate. Consequently, the elastic plate is subjected to deformation.

In an embodiment, the skirt part of the keycap includes at least one pressing part, and the at least one pressing part is aligned with the at least one raised platform of the elastic plate. While the keycap is moved downwardly toward the elastic plate, the at least one pressing part of the skirt part of the keycap is correspondingly moved to press the at least one raised platform of the elastic plate. Consequently, the elastic plate is subjected to deformation.

In an embodiment, each of the plural key structures further includes a separation plate. The separation plate is arranged between the elastic plate and the membrane circuit board. The separation plate includes a first central hollow region and at least one lateral hollow region. The at least one lateral hollow region is located beside the first central hollow region. The at least one lateral hollow region is aligned with the at least one pressure sensing structure of the membrane circuit board. the at least one triggering part of the elastic plate is penetrated through the at least one lateral hollow region and aligned with the at least one pressure sensing structure.

In an embodiment, the elastic plate further includes a second central hollow region, and the membrane circuit board further includes a third central hollow region. the first central hollow region, the second central hollow region and the third central hollow region are aligned with each other.

In an embodiment, each of the plural the plural key structures further includes a connecting member. The connecting member is penetrated through the second central hollow region of the elastic plate, the first central hollow region of the separation plate and the third central hollow region of the membrane circuit board sequentially, and the connecting member is connected between the keycap and the base plate, wherein the keycap is movable upwardly or downwardly relative to the base plate through the connecting member.

In an embodiment, the membrane circuit board further includes a first membrane substrate and a second membrane substrate. The first membrane substrate and the second membrane substrate are opposed to each other. The at least one pressure sensing structure is arranged between the first membrane substrate and the second membrane substrate.

In an embodiment, the membrane circuit board further includes an adhesive layer. The adhesive layer is arranged between the first membrane substrate and the second membrane substrate, and the adhesive layer is arranged around the pressure sensing structure.

In an embodiment, each of the at least one pressure sensing structure includes a first comb-shaped circuit pattern, a second comb-shaped circuit pattern, a spacer layer, a first conductive ink layer and a second conductive ink layer. The first comb-shaped circuit pattern is formed on the first membrane substrate. The second comb-shaped circuit pattern is formed on the second membrane substrate. The spacer layer is arranged between the first comb-shaped circuit pattern and the second comb-shaped circuit pattern. The first conductive ink layer is arranged between the first comb-shaped circuit pattern and the spacer layer. The second conductive ink layer is arranged between the second comb-shaped circuit pattern and the spacer layer.

In an embodiment, the first comb-shaped circuit pattern includes plural first conductive strips, and the second comb-shaped circuit pattern includes plural second conductive strips. The plural first conductive strips and the plural second conductive strips are extended toward each other. The plural first conductive strips and the plural second conductive strips are arranged in a staggered form.

In accordance with another aspect of the present invention, a key structure is provided. The key structure includes a base plate, a keycap, a membrane circuit board and an elastic plate. The keycap is located over the base plate. The keycap includes a top wall and a skirt part. The skirt part is protruded from a periphery region of the top wall and extended toward the base plate. The membrane circuit board is arranged between the keycap and the base plate. The membrane circuit board includes at least one pressure sensing structure. The elastic plate is arranged between the keycap and the membrane circuit board. The elastic plate includes at least one triggering part. The at least one triggering part is extended toward the membrane circuit board and aligned with the at least one pressure sensing structure. While the keycap is moved downwardly toward the elastic plate, the skirt part of the keycap is correspondingly moved to press the elastic plate, and the elastic plate is subjected to deformation. Consequently, the at least one triggering part is moved downwardly to press the at least one pressure sensing structure.

From the above descriptions, the present invention provides the keyboard device. The key structure of the keyboard device is specially designed. The skirt part of the keycap and the elastic plate cooperate with each other to press the corresponding pressure sensing structure. Moreover, the wiring structures of the first comb-shaped circuit pattern and the second comb-shaped circuit pattern of the pressure sensing structure are specially designed. Due to this special design, the cooperation of the skirt part of the keycap and the elastic plate can trigger the corresponding pressure sensing structure at a shortened displacement. In other words, the pressure sensing structure can be triggered quickly and accurately. Moreover, the keyboard device with the key structure of the present invention can be applied to the slim-type electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
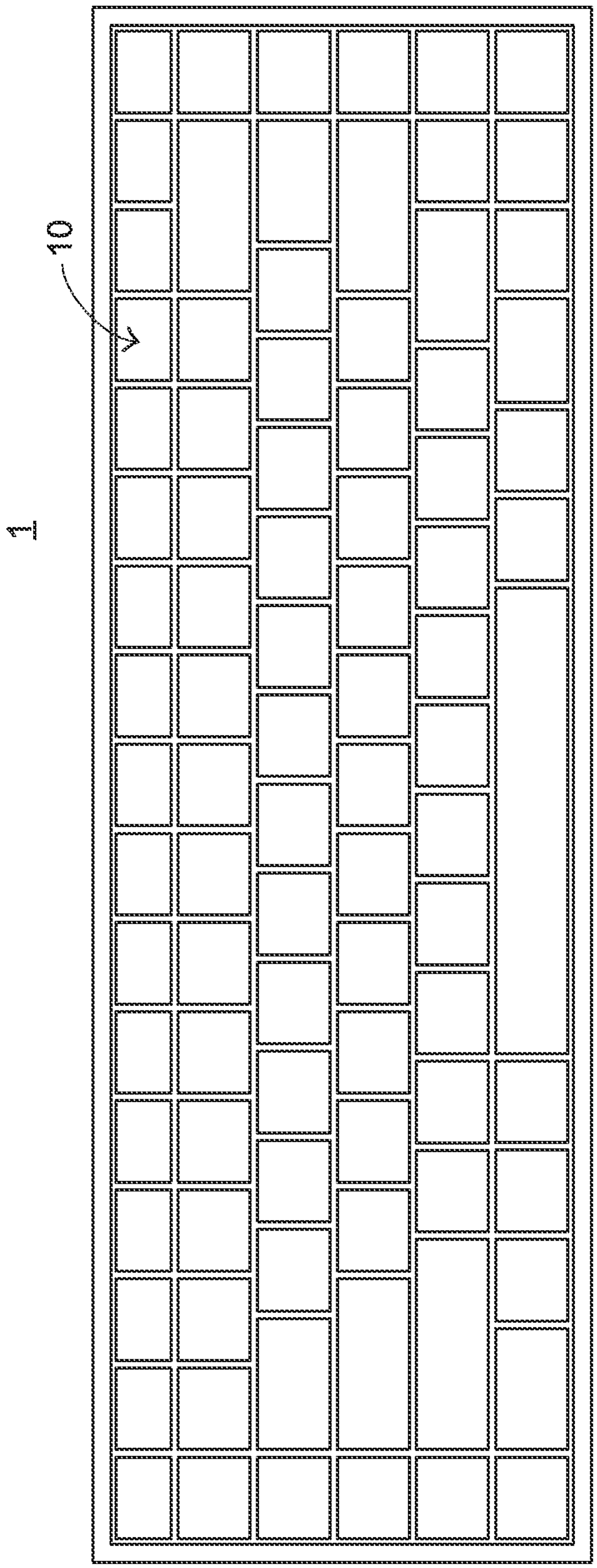
FIG. 1 is a schematic top view illustrating the outer appearance of a keyboard device according to an embodiment of the present invention.
Figure 2:
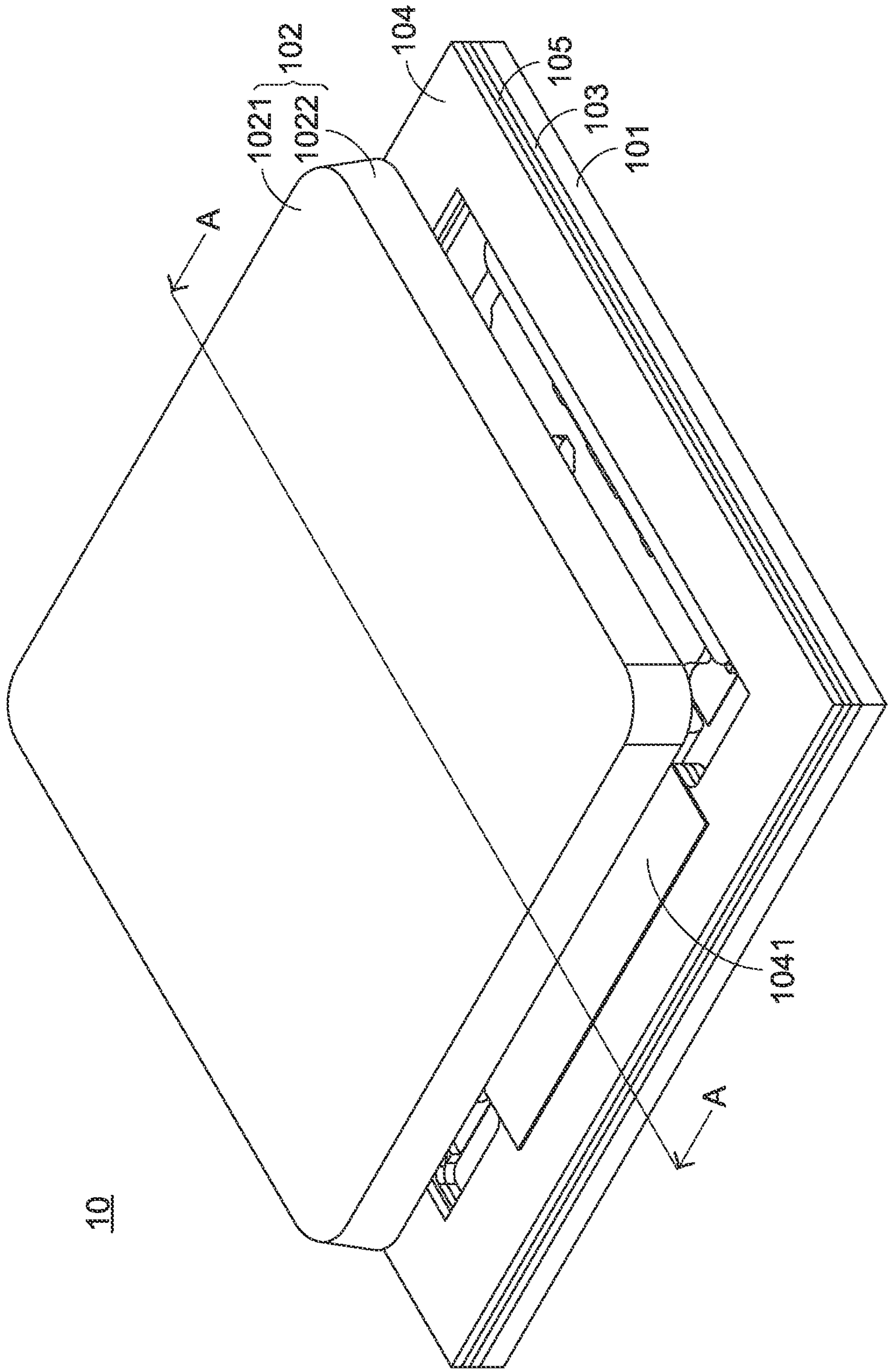
FIG. 2 is a schematic perspective view illustrating a key structure of the keyboard device as shown in FIG. 1.
Figure 3:
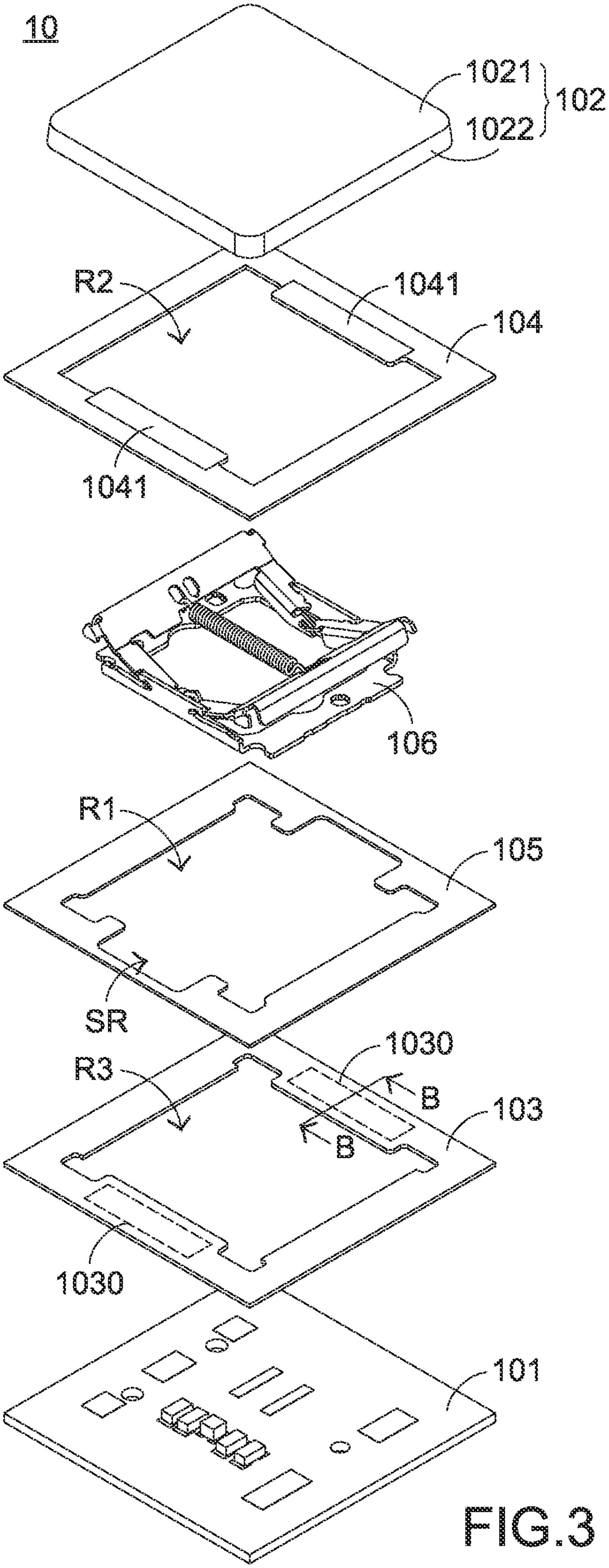
FIG. 3 is a schematic exploded view illustrating the key structure as shown in FIG. 2 and taken along a viewpoint.
Figure 4:
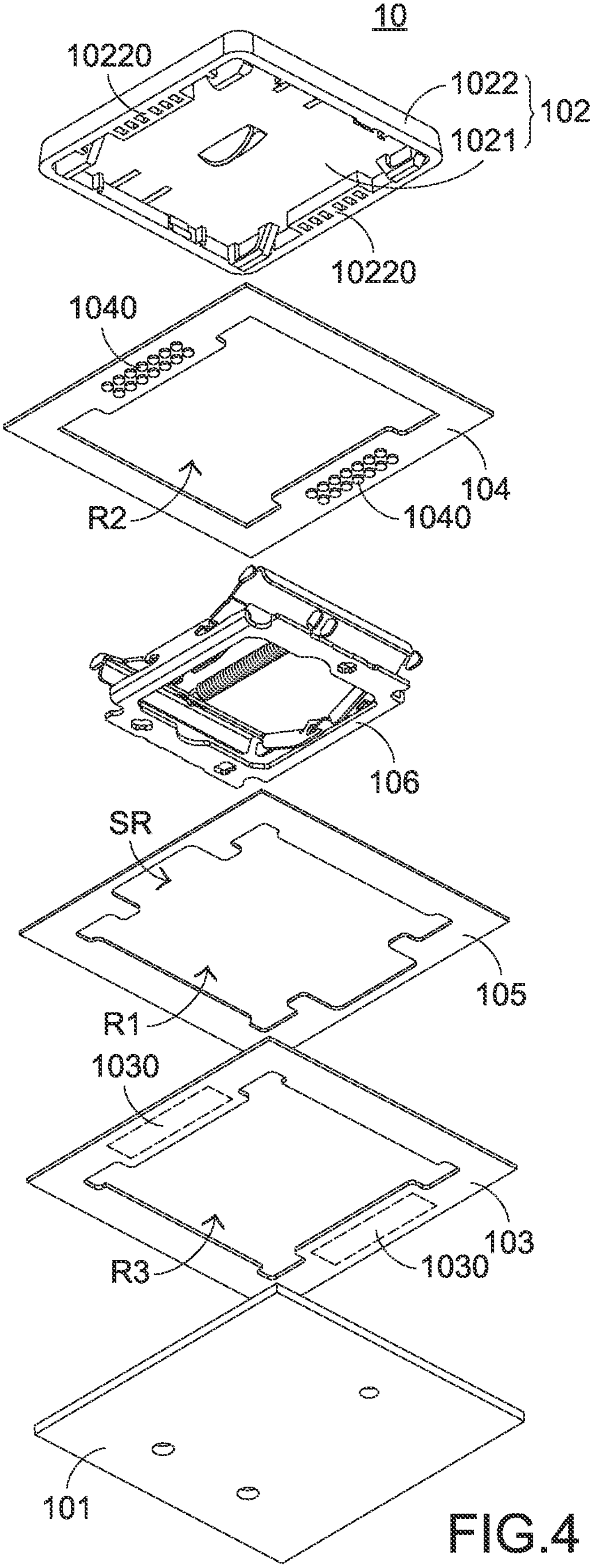
FIG. 4 is a schematic exploded view illustrating the key structure as shown in FIG. 2 and taken along another viewpoint.
Figure 5:
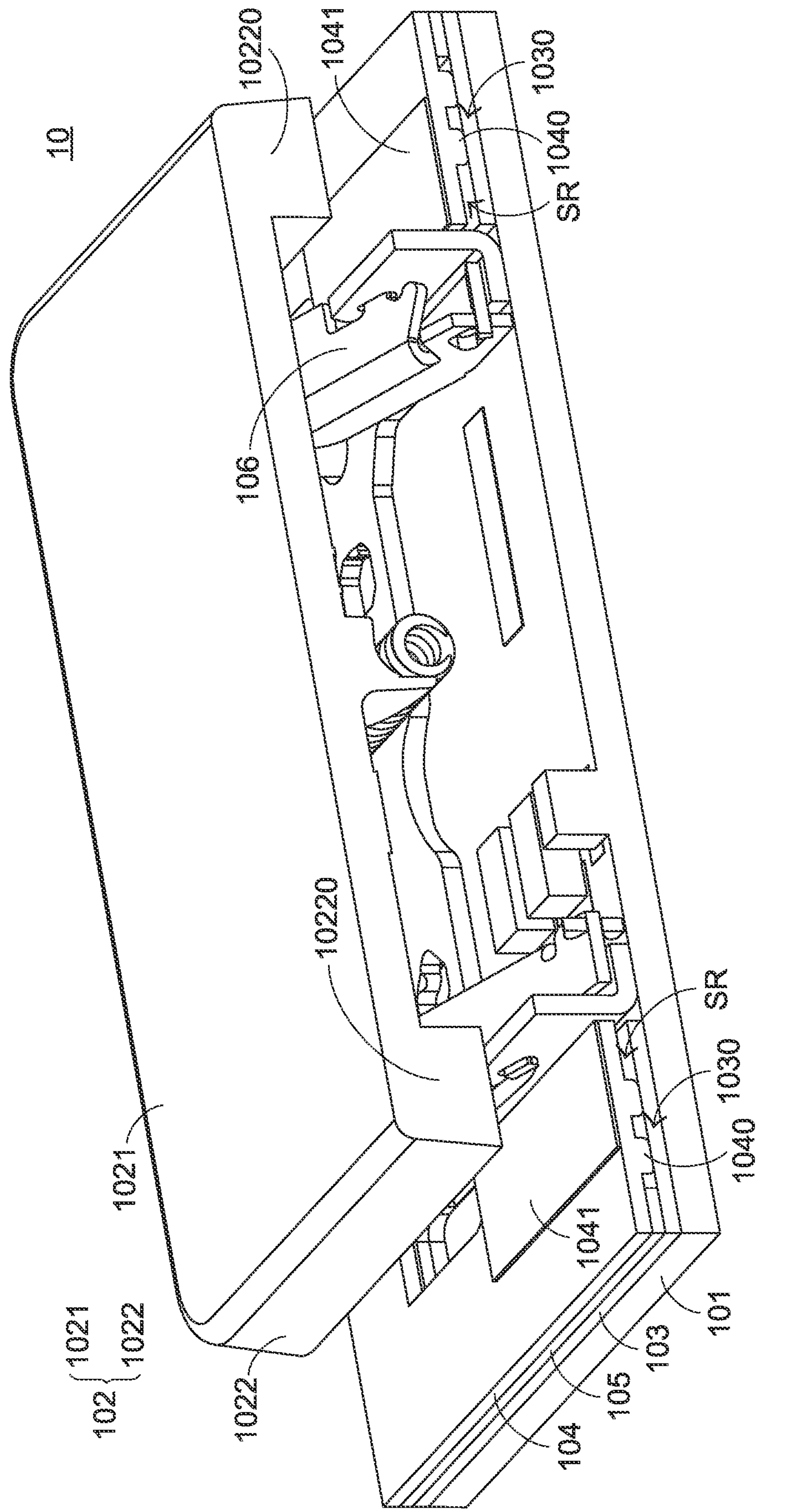
FIG. 5 is a schematic cutaway view illustrating the key structure as shown in FIG. 2 and taken along the line AA.
Figure 6:
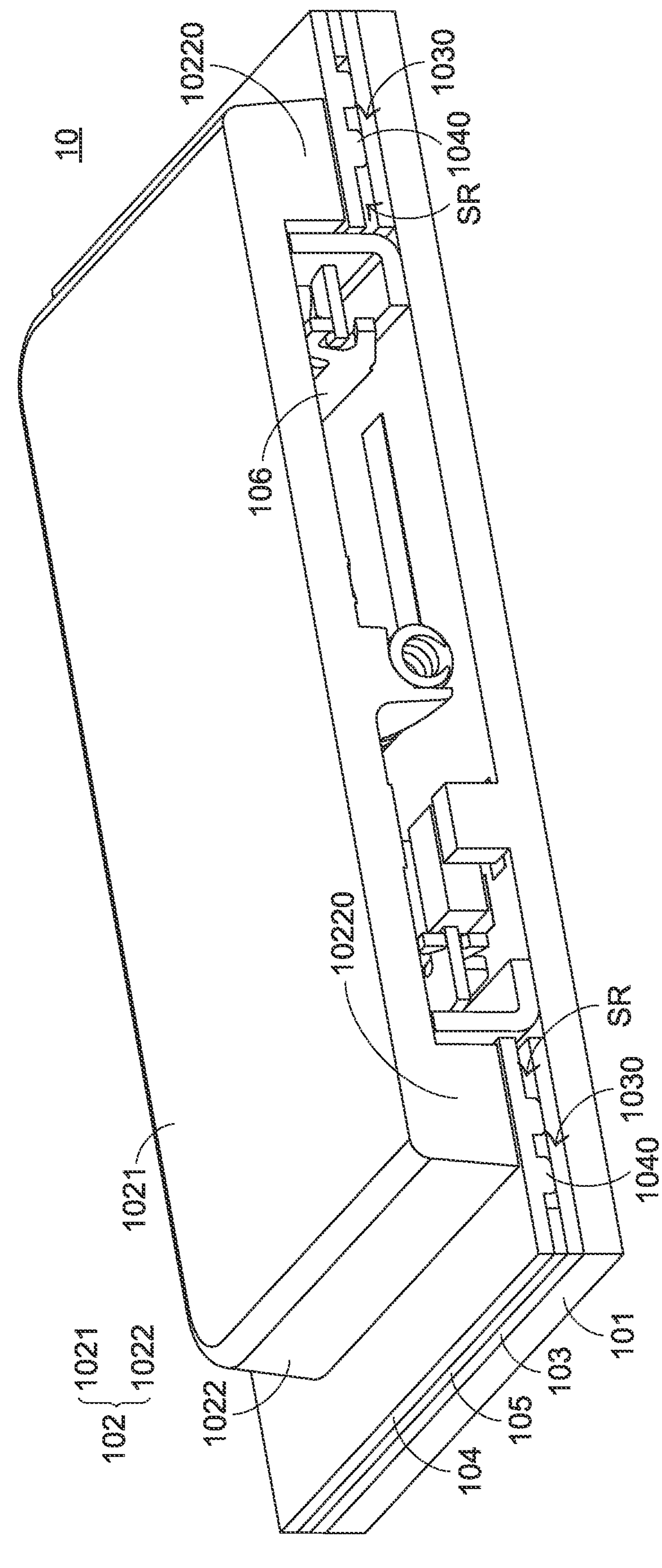
FIG. 6 is a schematic cutaway view illustrating the key structure as shown in FIG. 5, in which the key structure is pressed down.
Figure 7:
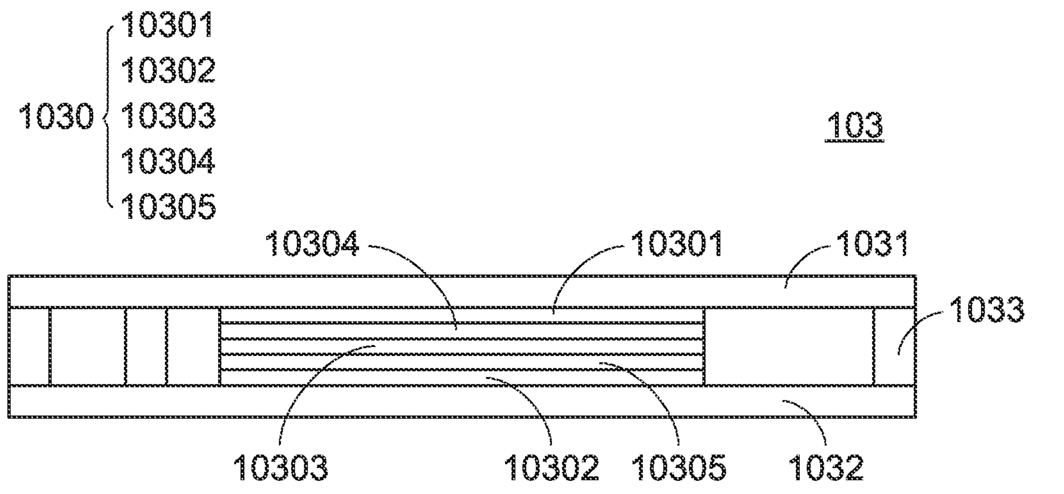
FIG. 7 is a schematic cross-sectional view illustrating the membrane circuit board of the key structure as shown in FIG. 3 and taken along the line BB.
Figure 8:
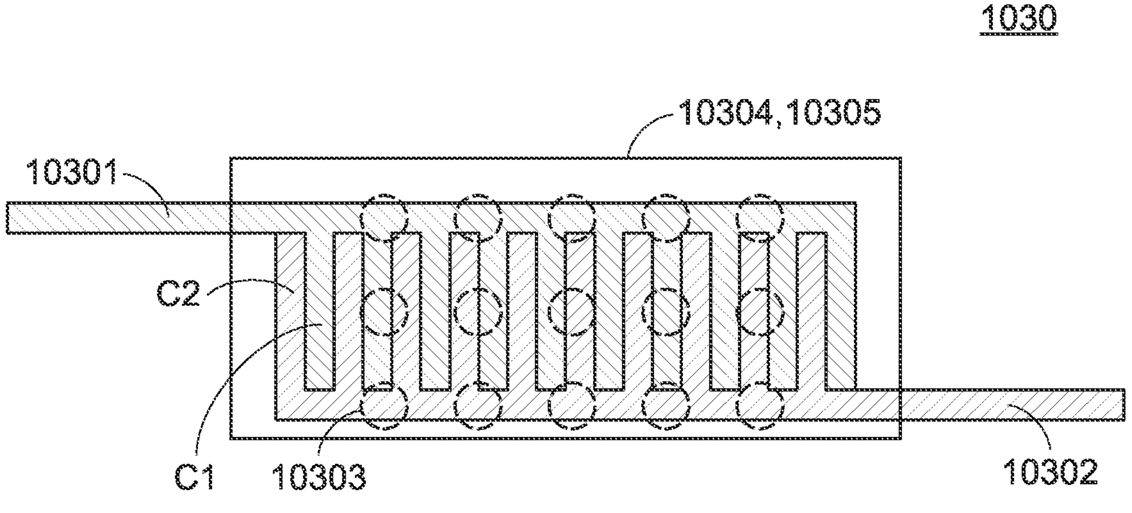
FIG. 8 is a schematic top view illustrating the pressure sensing structure in the membrane circuit board as shown in FIG. 7.

Please refer to FIGS. 1 to 8. FIG. 1 is a schematic top view illustrating the outer appearance of a keyboard device according to an embodiment of the present invention. FIG. 2 is a schematic perspective view illustrating a key structure of the keyboard device as shown in FIG. 1. FIG. 3 is a schematic exploded view illustrating the key structure as shown in FIG. 2 and taken along a viewpoint. FIG. 4 is a schematic exploded view illustrating the key structure as shown in FIG. 2 and taken along another viewpoint. FIG. 5 is a schematic cutaway view illustrating the key structure as shown in FIG. 2 and taken along the line AA. FIG. 6 is a schematic cutaway view illustrating the key structure as shown in FIG. 5, in which the key structure is pressed down. FIG. 7 is a schematic cross-sectional view illustrating the membrane circuit board of the key structure as shown in FIG. 3 and taken along the line BB. FIG. 8 is a schematic top view illustrating the pressure sensing structure in the membrane circuit board as shown in FIG. 7.

As shown in FIG. 1, the keyboard device 1 comprises plural key structures 10. These key structures 10 are classified into some types, e.g., ordinary keys, numeric keys and function keys. When one of the key structures 10 is depressed by the user's finger, the keyboard device 1 generates a corresponding key signal to a computer, and thus the computer executes a corresponding function. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

The key structure 10 of the keyboard device 1 will be described in more details as follows.

As shown in FIGS. 2 to 8, the key structure 10 comprises a base plate 101, a keycap 102, a membrane circuit board 103 and an elastic plate 104.

The keycap 102 is located over the base plate 101. The keycap 102 comprises a top wall 1021 and a skirt part 1022. The skirt part 1022 of the keycap 102 is protruded from a periphery region of the top wall 1021 of the keycap 102 and extended in the direction toward the base plate 101.

The membrane circuit board 103 comprises at least one pressure sensing structure 1030.

The elastic plate 104 is arranged between the keycap 102 and the membrane circuit board 103. Moreover, the membrane circuit board 103 comprises at least one triggering part 1040. The at least one triggering part 1040 is extended in the direction toward the membrane circuit board 103. Moreover, the at least one triggering part 1040 is aligned with the at least one pressure sensing structure 1030.

While the keycap 102 is moved downwardly toward the elastic plate 104, the skirt part 1022 of the keycap 102 is correspondingly moved to press the elastic plate 104, and the elastic plate 104 is subjected to deformation. As the elastic plate 104 is subjected to deformation, the triggering part 1040 on the elastic plate 104 is moved downwardly to press the corresponding pressure sensing structure 1030 of the membrane circuit board 103. Since the pressure sensing structure 1030 is pressed by the triggering part 1040, a pressure sensing signal is generated.

Please refer to FIGS. 2 to 6 again. In an embodiment, the elastic plate 104 further comprises at least one raised platform 1041. The at least one raised platform 1041 is protruded in the direction toward the keycap 102 and aligned with the skirt part 1022 of the keycap 102. Particularly, the at least one raised platform 1041 is disposed on a top surface of the elastic plate 104 (i.e., the surface facing the keycap 102), and the at least one triggering part 1040 is disposed on a bottom surface of the elastic plate 104 (i.e., the surface facing the membrane circuit board 103 or the surface facing the base plate 101). While the keycap 102 is moved downwardly toward the elastic plate 104, the skirt part 1022 of the keycap 102 is correspondingly moved to press the raised platform 1041 of the elastic plate 104, and the elastic plate 104 is subjected to deformation. As the elastic plate 104 is subjected to deformation, the triggering part 1040 on the elastic plate 104 is moved downwardly to press the corresponding pressure sensing structure 1030 of the membrane circuit board 103. Due to the arrangement of the raised platform 1041, the deformation of the elastic plate 104 is more obvious. Consequently, the pressure sensing structure 1030 can be certainly pressed by the triggering part 1040. In an embodiment, the triggering part 1040 of the elastic plate 104 comprises plural protrusion posts, which are extended in the direction toward the membrane circuit board 103 and arranged in an array. It is noted that the profiles of the triggering part 1040 of the elastic plate 104 are not restricted.

Please refer to FIGS. 2 to 6 again. In an embodiment, the skirt part 1022 of the keycap 102 further comprises at least one pressing part 10220. The at least one pressing part 10220 is aligned with the at least one raised platform 1041 of the elastic plate 104. While the keycap 102 is moved downwardly toward the elastic plate 104, the pressing part 10220 of the skirt part 1022 of the keycap 102 is correspondingly moved to press the raised platform 1041 of the elastic plate 104, and the elastic plate 104 is subjected to deformation.

Please refer to FIGS. 2 to 6 again. In an embodiment, the key structure 10 further comprises a separation plate 105. The separation plate 105 is arranged between the elastic plate 104 and the membrane circuit board 103. The separation plate 105 comprises a first central hollow region R1 and at least one lateral hollow region SR. The at least one lateral hollow region SR is located beside the first central hollow region R1. The at least one lateral hollow region SR is aligned with the at least one pressure sensing structure 1030 of the membrane circuit board 103. The at least one triggering part 1040 of the elastic plate 104 is penetrated through the at least one lateral hollow region SR of the separation plate 105 and aligned with the at least one pressure sensing structure 1030 of the membrane circuit board 103. In this embodiment, the at least one lateral hollow region SR is located beside the periphery region of the first central hollow region R1. Preferably but not exclusively, the at least one lateral hollow region SR is in communication with the first central hollow region R1.

Please refer to FIGS. 2 to 6 again. In an embodiment, the elastic plate 104 further comprises a second central hollow region R2, and the membrane circuit board 103 further comprises a third central hollow region R3. In this embodiment, the first central hollow region R1 of the separation plate 105, the second central hollow region R2 of the elastic plate 104 and the third central hollow region R3 of the membrane circuit board 103 are aligned with each other.

Please refer to FIGS. 2 to 6 again. In an embodiment, the key structure 10 further comprises a connecting member 106. The connecting member 106 is penetrated through the second central hollow region R2 of the elastic plate 104, the first central hollow region R1 of the separation plate 105 and the third central hollow region R3 of the membrane circuit board 103 sequentially. In addition, the connecting member 106 is connected between the keycap 102 and the base plate 101. The keycap 102 is movable upwardly or downwardly relative to the base plate 101 through the connecting member 106. In an embodiment, the connecting member 106 and the base plate 101 are connected with each other through fastening elements or hooks. For example, in an embodiment, the connecting member 106 is fixed on the base plate 101 through fastening elements. In another embodiment, the base plate 101 is equipped with plural hooks, and the connecting member 106 and the base plate 101 are connected with each other through the plural hooks. It is noted that the way of connecting the connecting member 106 and the base plate 101 is not restricted. In an embodiment, the keycap 102 is equipped with plural pivotal holes, and the keycap 102 and the connecting member 106 are connected with each other through the plural pivotal holes. It is noted that the way of connecting the keycap 102 and the connecting member 106 is not restricted. The operations of the connecting member 106 are similar to those of the conventional technologies, and not redundantly described herein.

In this embodiment, the at least one pressure sensing structure 1030 includes two pressure sensing structures 1030, and the two pressure sensing structures 1030 are installed on two opposite sides of the membrane circuit board 103. That is, the two pressure sensing structures 1030 are located beside two opposite sides of the third central hollow region R3. For complying with the number of the pressure sensing structures 1030, the key structure 10 comprises two pressing parts 10220, two triggering parts 1040, two raised platforms 1041 and two lateral hollow regions SR. That is, the two pressing parts 10220 are installed on two opposite sides of the skirt part 1022 of the keycap 102, the two triggering parts 1040 and the two raised platforms 1041 are installed on two opposite sides of the elastic plate 104, and the two lateral hollow regions SR are formed in two opposite sides of the separation plate 105. It is noted that the numbers of these components are not restricted. That is, the numbers of these components can be increased to more than 2 (e.g., 4, 6 or 8) according to the practical requirements.

Please refer to FIG. 7 again. In an embodiment, the membrane circuit board 103 further comprises a first membrane substrate 1031 and a second membrane substrate 1032, which are opposed to each other. The at least one pressure sensing structure 1030 is arranged between the first membrane substrate 1031 and the second membrane substrate 1032.

Please refer to FIG. 7 again. In an embodiment, the membrane circuit board 103 further comprises an adhesive layer 1033. The adhesive layer 1033 of the membrane circuit board 103 is arranged between the first membrane substrate 1031 and the second membrane substrate 1032. In addition, the adhesive layer 1033 is arranged around the pressure sensing structure 1030. The first membrane substrate 1031 and the second membrane substrate 1032 are combined together through the adhesive layer 1033. In addition, the adhesive layer 1033 can prevent the ambient moisture from entering the region between the first membrane substrate 1031 and the second membrane substrate 1032.

Please refer to FIG. 7 again. In an embodiment, the pressure sensing structure 1030 comprises a first comb-shaped circuit pattern 10301, a second comb-shaped circuit pattern 10302, a spacer layer 10303, a first conductive ink layer 10304 and a second conductive ink layer 10305. The first comb-shaped circuit pattern 10301 is formed on the first membrane substrate 1031. The second comb-shaped circuit pattern 10302 is formed on the second membrane substrate 1032. The spacer layer 10303 is arranged between the first comb-shaped circuit pattern 10301 and the second comb-shaped circuit pattern 10302. The first conductive ink layer 10304 is arranged between the first comb-shaped circuit pattern 10301 and the spacer layer 10303. The second conductive ink layer 10305 is arranged between the second comb-shaped circuit pattern 10302 and the spacer layer 10303. Preferably but not exclusively, the first conductive ink layer 10304 and the second conductive ink layer 10305 are made of silver paste.

Please refer to FIG. 8. In an embodiment, the first comb-shaped circuit pattern 10301 of the pressure sensing structure 1030 comprises plural first conductive strips C1, and the second comb-shaped circuit pattern 10302 of the pressure sensing structure 1030 comprises plural second conductive strips C2. The plural first conductive strips C1 and the plural second conductive strips C2 are extended in the directions toward each other. Moreover, the plural first conductive strips C1 and the plural second conductive strips C2 are arranged in a staggered form. Since the plural first conductive strips C1 of the first comb-shaped circuit pattern 10301 and the plural second conductive strips C2 of the second comb-shaped circuit pattern 10302 are arranged in the staggered form, the pressure sensing structure 1030 can sense the pressure applied thereon more sensitively.

In an embodiment, the pressure sensing structure 1030 is a force sensitive resistor. A process of forming the pressure sensing structure 1030 will be described as follows. Firstly, the first comb-shaped circuit pattern 10301 is formed on the first membrane substrate 1031, and the second comb-shaped circuit pattern 10302 is formed on the second membrane substrate 1032. Then, the first conductive ink layer 10304 and the second conductive ink layer 10305 are respectively formed on the first comb-shaped circuit pattern 10301 and the second comb-shaped circuit pattern 10302 to cover the first comb-shaped circuit pattern 10301 and the second comb-shaped circuit pattern 10302. Then, the first membrane substrate 1031 and the second membrane substrate 1032 are attached on each other through the adhesive layer 1033. Meanwhile, a semiconductor layer with a resistance value is formed between the first comb-shaped circuit pattern 10301 and the second comb-shaped circuit pattern 10302. As the magnitude of the pressure is increased, the resistance value is gradually decreased according to a specified rule. After the pressure is released, the resistance value is returned to its original value.

From the above descriptions, the present invention provides the keyboard device. The key structure of the keyboard device is specially designed. The skirt part of the keycap and the elastic plate cooperate with each other to press the corresponding pressure sensing structure. Moreover, the wiring structures of the first comb-shaped circuit pattern and the second comb-shaped circuit pattern of the pressure sensing structure are specially designed. Due to this special design, the cooperation of the skirt part of the keycap and the elastic plate can trigger the corresponding pressure sensing structure at a shortened displacement. In other words, the pressure sensing structure can be triggered quickly and accurately. Moreover, the keyboard device with the key structure of the present invention can be applied to the slim-type electronic device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device comprising plural key structures, each of the plural key structures comprising:

a base plate;

a keycap located over the base plate, and comprising a top wall and a skirt part, wherein the skirt part is protruded from a periphery region of the top wall and extended toward the base plate;

a membrane circuit board arranged between the keycap and the base plate, and comprising at least one pressure sensing structure; and an elastic plate arranged between the keycap and the membrane circuit board, and comprising at least one triggering part, wherein the at least one triggering part is extended toward the membrane circuit board, and aligned with the at least one pressure sensing structure, wherein while the keycap is moved downwardly toward the elastic plate, the skirt part of the keycap is correspondingly moved to press the elastic plate, and the elastic plate is subjected to deformation, so that the at least one triggering part is moved downwardly to press the at least one pressure sensing structure.

2. The keyboard device according to claim 1, wherein the elastic plate further comprises at least one raised platform, and the at least one raised platform is protruded toward the keycap and aligned with the skirt part of the keycap, wherein while the keycap is moved downwardly toward the elastic plate, the skirt part of the keycap is correspondingly moved to press the at least one raised platform of the elastic plate, so that the elastic plate is subjected to deformation.

3. The keyboard device according to claim 2, wherein the skirt part of the keycap comprises at least one pressing part, and the at least one pressing part is aligned with the at least one raised platform of the elastic plate, wherein while the keycap is moved downwardly toward the elastic plate, the at least one pressing part of the skirt part of the keycap is correspondingly moved to press the at least one raised platform of the elastic plate, so that the elastic plate is subjected to deformation.

4. The keyboard device according to claim 1, wherein each of the plural key structures further comprises a separation plate, wherein the separation plate is arranged between the elastic plate and the membrane circuit board, and the separation plate comprises a first central hollow region and at least one lateral hollow region, wherein the at least one lateral hollow region is located beside the first central hollow region, the at least one lateral hollow region is aligned with the at least one pressure sensing structure of the membrane circuit board, and the at least one triggering part of the elastic plate is penetrated through the at least one lateral hollow region and aligned with the at least one pressure sensing structure.

5. The keyboard device according to claim 4, wherein the elastic plate further comprises a second central hollow region, and the membrane circuit board further comprises a third central hollow region, wherein the first central hollow region, the second central hollow region and the third central hollow region are aligned with each other.

6. The keyboard device according to claim 5, wherein each of the plural key structures further comprises a connecting member, wherein the connecting member is penetrated through the second central hollow region of the elastic plate, the first central hollow region of the separation plate and the third central hollow region of the membrane circuit board sequentially, and the connecting member is connected between the keycap and the base plate, wherein the keycap is movable upwardly or downwardly relative to the base plate through the connecting member.

7. The keyboard device according to claim 1, wherein the membrane circuit board further comprises a first membrane substrate and a second membrane substrate, wherein the first membrane substrate and the second membrane substrate are opposed to each other, and the at least one pressure sensing structure is arranged between the first membrane substrate and the second membrane substrate.

8. The keyboard device according to claim 7, wherein the membrane circuit board further comprises an adhesive layer, wherein the adhesive layer is arranged between the first membrane substrate and the second membrane substrate, and the adhesive layer is arranged around the pressure sensing structure.

9. The keyboard device according to claim 1, wherein each of the at least one pressure sensing structure comprises:

a first comb-shaped circuit pattern formed on the first membrane substrate;

a second comb-shaped circuit pattern formed on the second membrane substrate;

a spacer layer arranged between the first comb-shaped circuit pattern and the second comb-shaped circuit pattern;

a first conductive ink layer arranged between the first comb-shaped circuit pattern and the spacer layer; and a second conductive ink layer arranged between the second comb-shaped circuit pattern and the spacer layer.

10. The keyboard device according to claim 9, wherein the first comb-shaped circuit pattern comprises plural first conductive strips, and the second comb-shaped circuit pattern comprises plural second conductive strips, wherein the plural first conductive strips and the plural second conductive strips are extended toward each other, and the plural first conductive strips and the plural second conductive strips are arranged in a staggered form.

11. A key structure, comprising:

a base plate;

a keycap located over the base plate, and comprising a top wall and a skirt part, wherein the skirt part is protruded from a periphery region of the top wall and extended toward the base plate;

a membrane circuit board arranged between the keycap and the base plate, and comprising at least one pressure sensing structure; and an elastic plate arranged between the keycap and the membrane circuit board, and comprising at least one triggering part, wherein the at least one triggering part is extended toward the membrane circuit board, and aligned with the at least one pressure sensing structure, wherein while the keycap is moved downwardly toward the elastic plate, the skirt part of the keycap is correspondingly moved to press the elastic plate, and the elastic plate is subjected to deformation, so that the at least one triggering part is moved downwardly to press the at least one pressure sensing structure.

* * * * *